(12) United States Patent
Wilson

(10) Patent No.: US 6,917,973 B2
(45) Date of Patent: Jul. 12, 2005

(54) MANAGING ACCESS TO A NETWORK

(75) Inventor: James B. Wilson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 851 days.

(21) Appl. No.: 09/754,557

(22) Filed: Jan. 4, 2001

(65) Prior Publication Data

US 2002/0087698 A1 Jul. 4, 2002

(51) Int. Cl.[7] .............................................. G06F 15/173
(52) U.S. Cl. ....................... 709/225; 709/203; 709/224; 709/226; 709/229; 710/18; 710/19; 370/462
(58) Field of Search ................................ 709/203, 220, 709/223–229, 249; 370/462, 463; 710/15–19, 107

(56) References Cited

U.S. PATENT DOCUMENTS

| | | | | |
|---|---|---|---|---|
| 5,633,810 A | * | 5/1997 | Mandal et al. ............... | 370/431 |
| 5,732,213 A | * | 3/1998 | Gessel et al. ................ | 709/224 |
| 5,784,555 A | * | 7/1998 | Stone ........................... | 709/220 |
| 5,832,287 A | * | 11/1998 | Atalla ........................... | 709/231 |
| 5,961,608 A | * | 10/1999 | Onosaka et al. ............. | 709/249 |
| 6,049,821 A | * | 4/2000 | Theriault et al. ............ | 709/203 |
| 6,233,604 B1 | * | 5/2001 | Van Horne et al. ......... | 709/203 |
| 6,317,793 B1 | * | 11/2001 | Toyosawa ..................... | 709/228 |
| 6,356,622 B1 | * | 3/2002 | Hassell et al. .............. | 379/1.01 |
| 6,418,214 B1 | * | 7/2002 | Smythe et al. ........... | 379/202.01 |
| 6,587,877 B1 | * | 7/2003 | Douglis et al. .............. | 709/224 |
| 6,643,262 B1 | * | 11/2003 | Larsson et al. ............. | 370/236 |
| 6,714,931 B1 | * | 3/2004 | Papierniak et al. ........... | 707/10 |
| 6,757,743 B1 | * | 6/2004 | Tamori et al. ............... | 709/249 |
| 6,804,500 B2 | * | 10/2004 | Yamaguchi ............... | 455/127.1 |
| 2001/0000301 A1 | * | 4/2001 | Zong et al. | |
| 2002/0035403 A1 | * | 3/2002 | Clark et al. | |
| 2002/0194507 A1 | * | 12/2002 | Kanzawa et al. | |

FOREIGN PATENT DOCUMENTS

DE         10008094 A1 *  8/2001   .......... H04M/11/00

* cited by examiner

*Primary Examiner*—Anthony Knight
*Assistant Examiner*—Crystal J Barnes
(74) *Attorney, Agent, or Firm*—Trop, Pruner & Hu, P.C.

(57) ABSTRACT

A network connection on a processor-based system may be managed by a software layer that accommodates for a variety of different types or characteristics of network connections. In effect, the software layer abstracts the characteristics of a variety of different connections and enables the client on the processor-based system to connect without concern for the particular characteristics of the resident connection. In addition, the software layer may determine when to release a connection to the Internet. This may reduce the disruption that may occur when multiple clients use the same connection and one of those clients disconnects the connection, thereby terminating the access to the connection by one or more other clients.

18 Claims, 6 Drawing Sheets

MANAGING ACCESS TO A NETWORK

BACKGROUND

This invention relates generally to the use of a processor-based system to access information over a network such as the Internet.

At any given time, a processor-based system may include a plurality of software clients that access information from web servers using the same Internet connection. An Internet connection is typically a modem connected to an Internet service provider, a Digital Subscriber Line (DSL), a cable connection, a satellite connection, an Ethernet or a local area network (LAN). As used herein, a software client is any software component which may need to access to a network. The client may be an application or a part of an application. Thus, a plurality of software clients within the same process or from different processes may attempt to access a network through one or more connections at the same time.

Typically, in a dial up connection, a telephone link is established when any given client wishes to access the Internet. In some cases, the first client to access the Internet establishes the connection. That client controls the connection and may terminate the connection when the first client is done accessing the Internet. A second client seeking to access the Internet may determine that the first client has already established a connection and, using the Transmission Control Protocol (TCP)/Internet Protocol (IP), may access the Internet using the preexisting connection. When the first client terminates the connection, the first client may inadvertently and unknowingly terminate the connection being used by the second client as well. Thus, the activities undertaken by the second client may be interrupted and the second client must reestablish a connection with the web server. This inadvertent disconnection of one or more multiple users of a shared connection may result in inefficient use of the connection, may unnecessarily waste system resources and may result in delay and loss of information.

Moreover, because there are a variety of different types of network connections and characteristics of those connections, each client typically must accommodate the various characteristics which the client may encounter in different processor-based systems. In other words, in order to make the client widely useful, the client software must accommodate a variety of different types of network or Internet connections, such as dial up connections, DSL connections, cable connections and satellite connections. Similarly, each connection may have unique characteristics in a given processor-based system from a particular manufacturer. All this information is typically encapsulated into a given client so that each client is able to account for the peculiarities of a variety of typical interconnections.

As a result, the client is unnecessarily made more complicated and more burdensome. In addition, the client may not work seamlessly with all types and characteristics of network connections.

Thus, there is a need for better ways to enable clients to access network connections.

DETAILED DESCRIPTION

Figure 1:
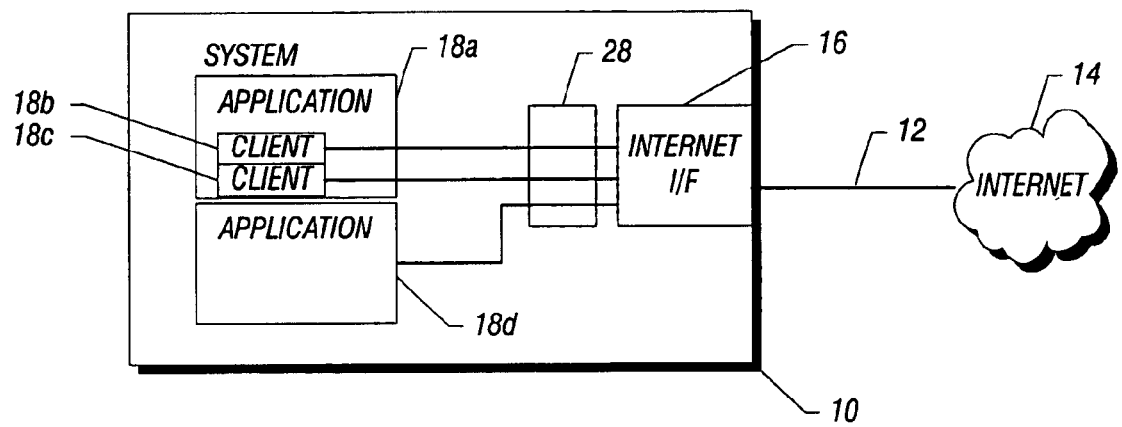
FIG. 1 is a schematic depiction of one embodiment of the present invention.

Referring to FIG. 1, a processor-based system 10 may utilize a connection 12 to enable information to be exchanged over a network such as the Internet 14. A network interface 16 may be a modem, a network interface card or other types of network or Internet interfaces. The connection 12 may be a dial up or telephone connection, a cable connection, a network connection, a satellite connection or a DSL, as examples.

The processor-based system 10 may be a desktop computer, a laptop computer, a set-top box or any of a variety of processor-based appliances. Thus, the present invention is applicable to a wide variety of processor-based systems 10, interfaces 16 and connections 12.

The typical system 10 may include at least two clients 18a and 18d that are applications. Each client 18a or 18d may in turn include a plurality of internal clients 18b and 18c. Thus, the clients 18 may at one time or another seek to establish a connection to a network 14 through the interface 16 and connection 12. Typically, each client 18 accesses the network 14 by establishing a TCP/IP or User Datagram Protocol (UDP) socket with its own unique port address. Thus, a variety of clients 18 on the same system 10 may access a connection 12 at the same time, each using their own socket in one embodiment.

A connection manager 28 is a software layer that provides an abstraction interface between the connection 12 and the clients that seek to access the connection 12. In some embodiments, the connection manager 28 accommodates a variety of different connection interface 16 types and connection characteristics. This avoids the need to enable each client 18 within a given system 10 to be able to deal with the variety of different interfaces 16 and connections 12 that may be encountered in a variety of different systems 10.

The connection manager 28 acts as an abstraction layer which abstracts the characteristics of a variety of different connections 12 and interfaces 16 and offloads the handling of these details from clients 18. In addition, in some embodiments, the connection manager 28 may manage the establishment of a connection 12 that is non-persistent such as a dial up connection established on demand over a telephone line.

Figure 2:
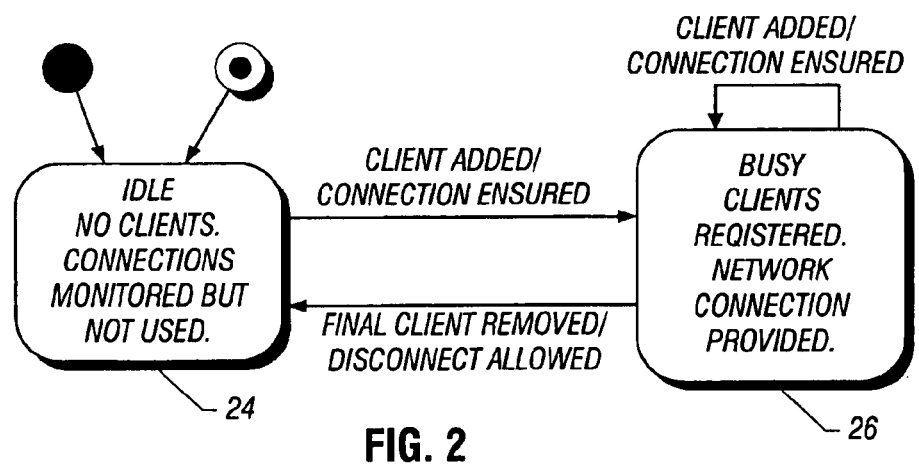
FIG. 2 is a state diagram for one embodiment of the present invention.

Referring to FIG. 2, in one embodiment, the connection manager 28 may have a busy state 26 and an idle state 24 and may transition between these two states. The connection manager 28 is in the busy state when clients 18 have registered with the connection manager 28 in order to access the connection 12. In the busy state, the connection 12 is either established and protected or the connection manager 28 is attempting to establish the connection 12. In the idle state 26, no clients 18 have (or remain) registered with the connection manager 28 and the connection 12 is automatically disconnected (if connected and the connection 12 is owned by the connection manager 28 and the connection 12 is not persistent).

Connections 12 may be borrowed or owned. A borrowed connection is a connection 12 that is not managed by the connection manager 28 and an owned connection is one which is actually managed by the connection manager 28. Thus, in any given system 10, some clients 18 may utilize the connection manager 28 and other clients 18 may not use the connection manager 28.

Generally, the clients 18 that use the connection manager 28 connect to the connection manager 28 as though the connection manager 28 was itself the network interface 16. Thus, in some cases, particular clients 18 do not need any special software to work with the connection manager 28 other than the connection manager 28 itself.

Figure 3:
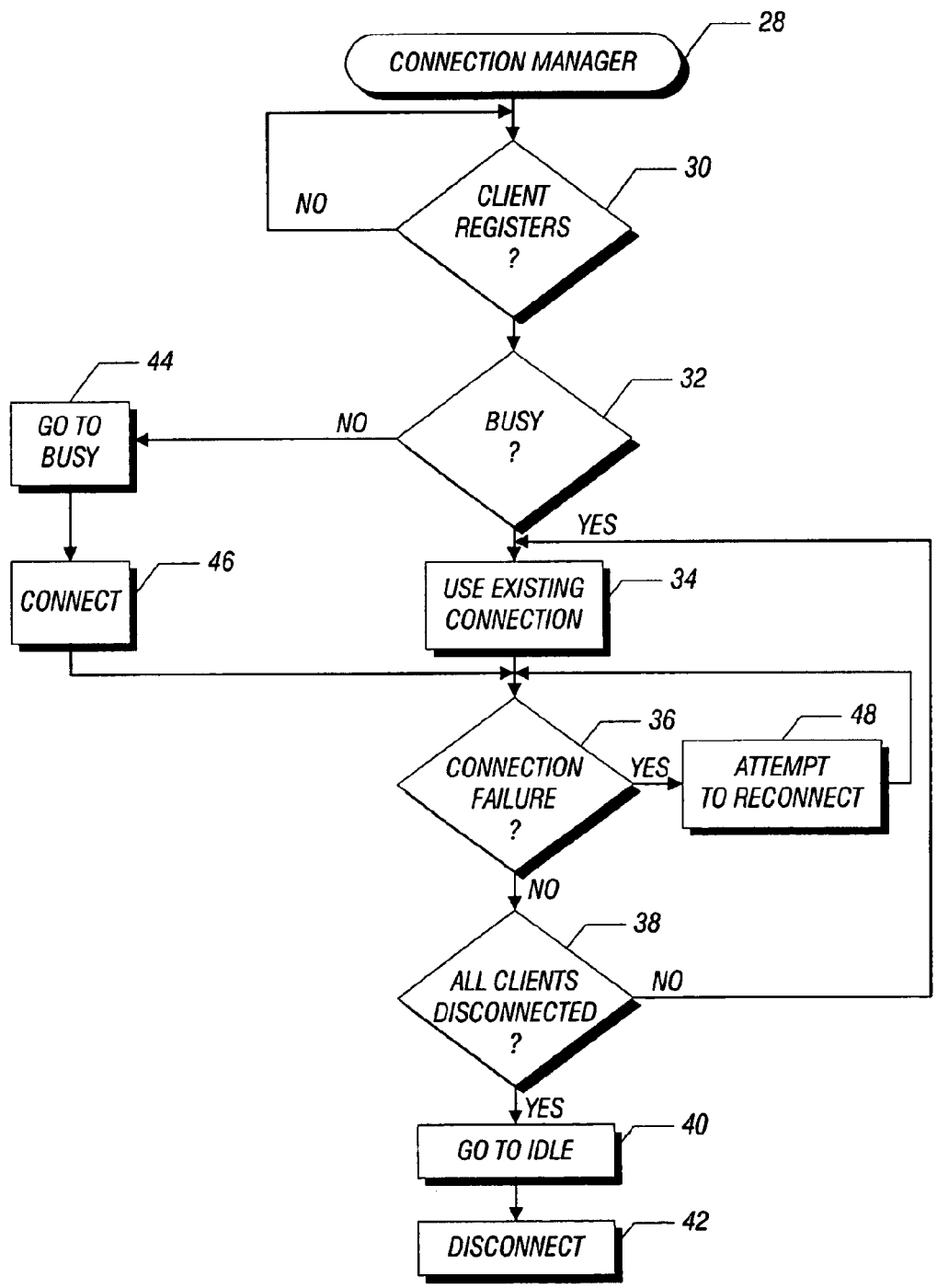
FIG. 3 is a flow chart for software in accordance with one embodiment of the present invention.

The operation of the connection manager 28, illustrated in FIG. 3 in accordance with one embodiment of the present invention, begins when a client 18 registers with the connection manager 28 as indicated in diamond 30. Once at least one client 18 registers, a check at diamond 32 determines whether the connection manager 28 is in the busy state. If so, an existing connection 16 has been established and may be utilized for the recently registering client 18 as indicated in block 34.

In the course of using the connection 12, the connection manager 28 monitors the connection 12 for a connection failure. When a connection failure is detected at diamond 36, the connection manager 28 may attempt to reconnect as indicated in block 48. Even though the connection has been lost, the connection manager 28 remains in the busy state so long as a client 18 continues to desire to connect to the network. In some cases, based on usage rules, a reconnection may not be attempted for example because the user disconnected.

If a connection failure is not detected, a check at diamond 38 determines whether all the clients 18 have disconnected from the connection 12. If so, the connection manager 28 transitions to the idle state as indicated in block 40. Subsequently, in one embodiment of the present invention, the connection manager 28 disconnects the connection 12 in the case of a non-persistent connection, such as the dial up type connection, as indicated in block 42. With persistent connections, it may be unnecessary to make a formal disconnection. In some embodiments, the disconnection occurs after expiration of a time out period after transitioning to the idle state. This gives the system 10 a chance to determine whether a client 18 wishes to maintain the connection or if a user wishes it to stay connected.

If the check at diamond 32 determines that the connection manager 28 is not in the busy state, the connection manager 28 transitions to the busy state as indicated in block 44. It thereafter attempts to connect to the network as indicated in block 46.

Figure 4:
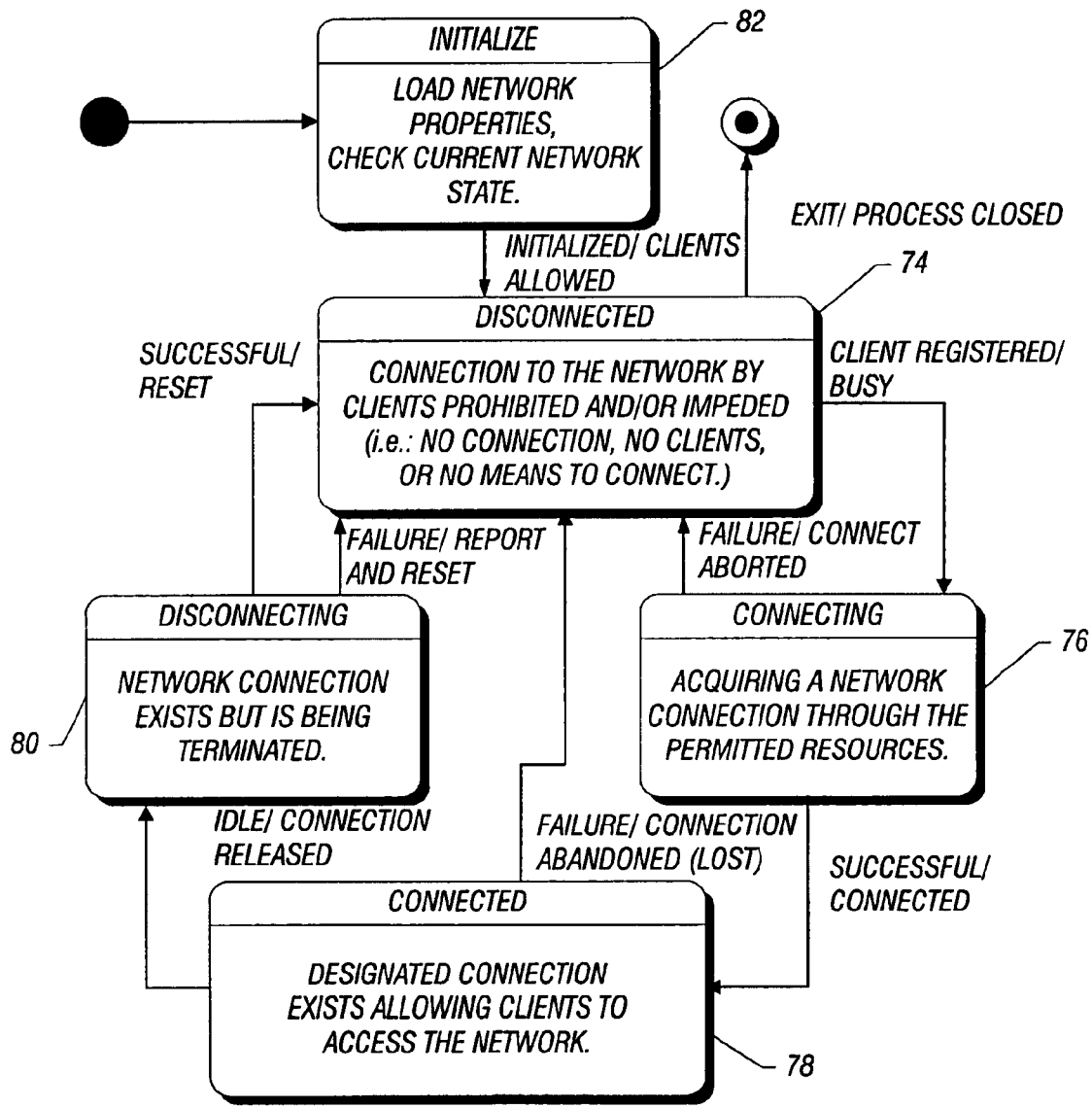
FIG. 4 is a state diagram for another embodiment of the present invention.

Turning next to FIG. 4, a state diagram for the connection manager 28 may include five distinct states in accordance with one embodiment of the present invention. The disconnected state 74 is opposed to the connected state 78. Between the disconnected state 74 and the connected state 78, the connection manager 28 transitions to a connecting state 76 or a disconnecting state 80. An initialize state 82 enables checking the current network state and loading network properties.

Initially, the connection manager 28 may be in the disconnected state 74 and, in response to a client registering, attempts to transition to the connected state 78 through the connecting state 76. In the connecting state 76, the connection manager 28 attempts to establish the connection to the network for example through a dial up connection in one example. If an error occurs in the course of connecting, the manager 28 may transition back to the disconnected state 74. If the connection process is successful, the manager 28 transitions to the connected state.

When all the clients 18 have disconnected, the manager 28 transitions from the connected state 78 to the disconnected state 74 via the disconnecting state 80. In the disconnecting state 80, the connection exists but is in the process of being terminated. If a disconnection error occurs, the system may transition to the disconnected state 74 while issuing an error message. Otherwise, it transitions to the disconnected state 74 without an error message.

Figure 5:
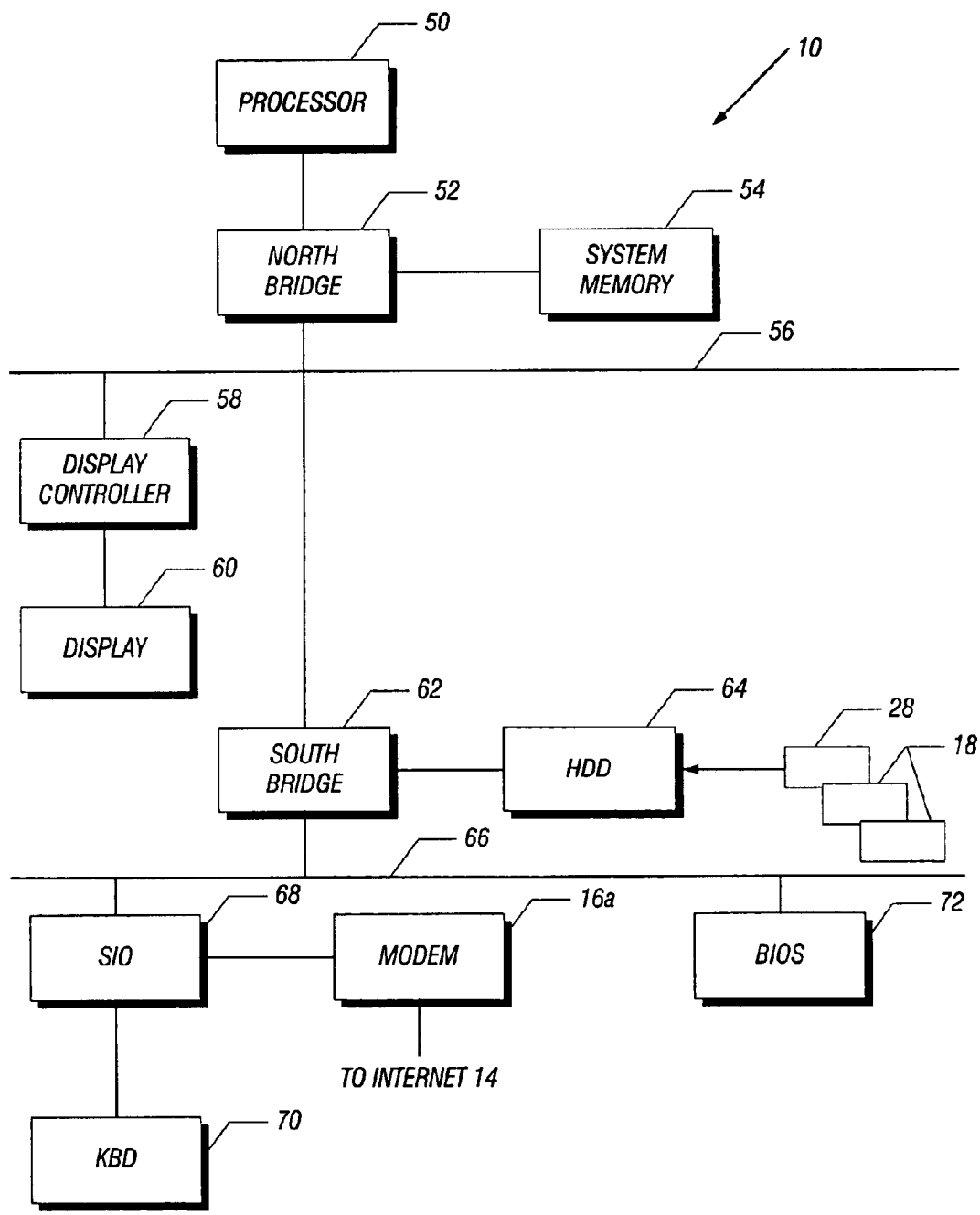
FIG. 5 is block diagram for one embodiment of the present invention.

One example of an implementation of the system 10, shown in FIG. 5, is provided for illustration purposes only and is not meant to in any way limit the present invention. The present invention may be applied to a variety of processor-based systems 10.

The illustrated system 10 includes a processor 50 coupled to a north bridge 52 in turn coupled to a south bridge 62. The north bridge 52 in that embodiment is also coupled to a system memory 54 and a bus 56. Still in the same embodiment, the bus 56 may in turn be coupled to a display controller 58 which interfaces with a display 60.

The south bridge 62 may in turn be coupled to a storage device such as a hard disk drive 64 and an additional bus 66 continuing in the same embodiment. The hard disk drive 64 may store the clients 18 as well as the connection manager 28.

In the illustrated embodiment, the bus 66 may be coupled through a serial input/output (SIO) device 68 to a network interface, such as a modem 16a which connects to the Internet 14. The SIO device 68 may also couple to other serial peripherals such as the keyboard 70. The bus 66 may also be coupled to a basic input/output system (BIOS) storage 72.

In some embodiments of the present invention, the connection manager 28 may abstract a variety of network interfaces 16 and connections 12 that may be encountered by software in any of a variety of processor-based systems 10. Thus, each client 18 may connect to the Internet, for example, without concern for the particular characteristic of a particular Internet interface or connection. In effect, each client 18 can connect to a network through the connection manager 28 as if the connection manager 28 was an abstracted or universal interface to the network. This avoids the need to provide special software in each client 18 to account for the variety of different network connections that may exist in the myriad of processor-based devices 10 that may be available.

Figure 8:
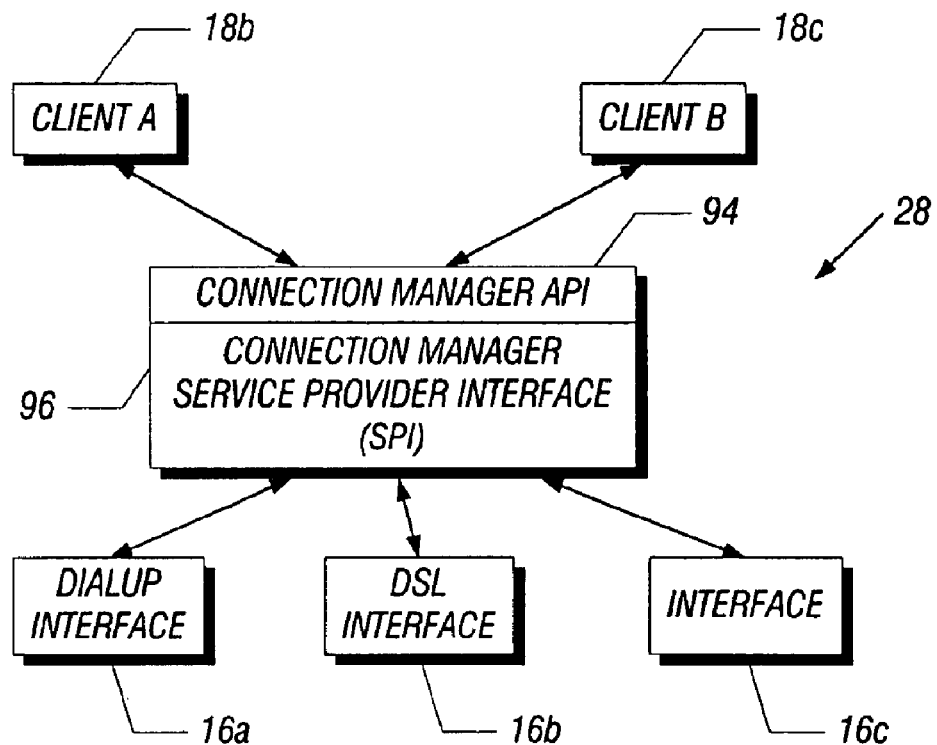
FIG. 8 is a schematic depiction of one embodiment of the present invention.

Referring to FIG. 8, in accordance with one embodiment of the present invention, the connection manager 28 may include a connection manager application program interface (API) 94 that interfaces with the clients 18b and 18c. In addition, the connection manager 28 may include a service provider interface (SPI) 96 that interfaces with the network interfaces 16a through 16c. The SPI 96 may interact with a dial up interface 16a, a DSL interface 16b and a specialized Internet service provider dial up interface 16c as one example. Thus, the connection manager 28 interfaces between disparate requirements of clients 18 and interfaces 16 and accommodates for these disparities in a way which results in seamless operation between clients 18 and interfaces 16 in some embodiments.

Moreover, in some embodiments, the possibility of inadvertent disconnection of a non-persistent Internet connection may be reduced. In conventional systems, when two or more clients are using the same Internet connection, one of those clients, when done with its connection, may terminate the connection. This may inadvertently cut off the other client which is simultaneously using the connection and which desires to continue to access the connection. As a result, the operation of the second client may be adversely affected, decreasing system performance and resulting in awkward operation or loss of information. The connection manager 28 keeps track of all of the clients 18 that are using a given connection and ensures that the connection is not terminated until all the active clients indicate that they have terminated their access to the connection.

Figure 6:
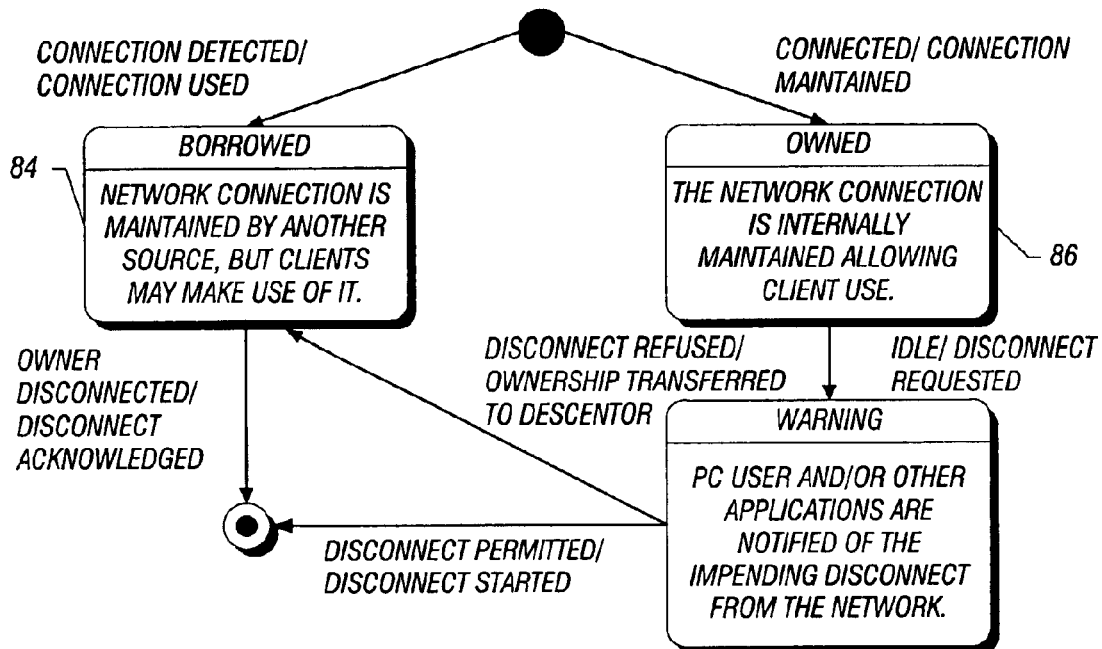
FIG. 6 is a state diagram for another embodiment of the present invention.

Referring to FIG. 6, the system 10 uses a state machine to determine whether a connection is a borrowed or an owned connection. In a borrowed state 84, the network connection is maintained by another source so that clients 18 may make use of it. An owned state 86 may involve a network connection that is internally maintained allowing client use through the manager 28. A warning state 88 allows the system user and/or other applications to be notified of the impending disconnection from the network. The warning state 88 may be utilized for owned connections.

When a disconnect is requested from the owned state 86, the system may go to the warning state 88. From the warning state 88, it may transition to a disconnection or may refuse to disconnect because the connection is still being utilized by clients not controlled by the connection manager 28 or clients may soon want to use the connection. From the borrowed state 84, the connection manager 28 may not disconnect the connection.

Figure 7:
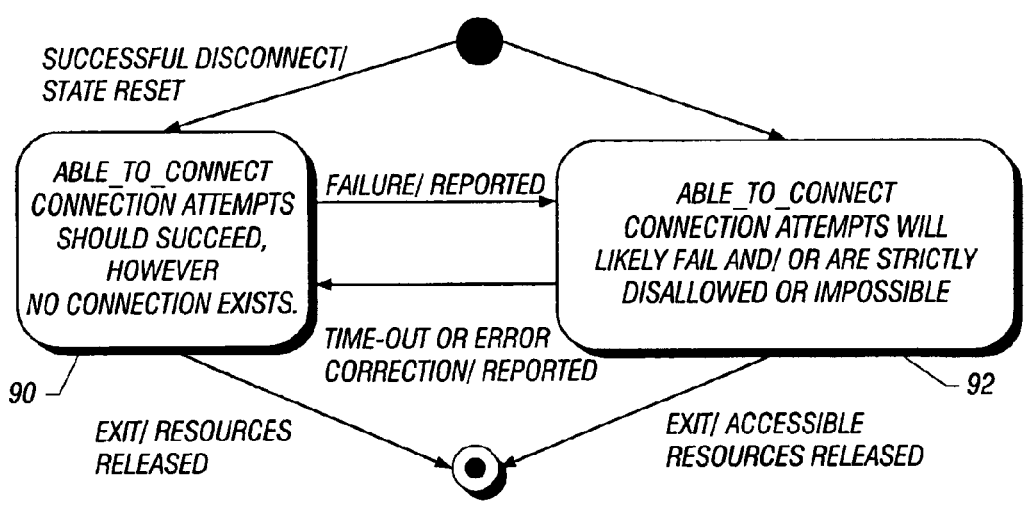
FIG. 7 is a state diagram for another embodiment of the present invention.

Within the disconnected state 82, there may be two substates, the able to connect substate 90 and unable to connect substate 92 as shown in FIG. 7. In the unable to connect substate 92, connection attempts will likely fail or be strictly disallowed or be impossible. The system may go to the state 92 when a failure or error is reported. The substate 92 may be exited when it is determined that the resources are again accessible. In addition, the substate 92 may be entered from the able to connect state 90 when a failure is reported. The system may transition to the able to connect state after a time out or an error correction is reported. The able to connect state 90 may be entered from a time out or when an error correction is reported from the unable to connect substate 92, as a result of a successful disconnect or state reset. The state 90 may be exited when all resources are released.

In the state machines represented in FIGS. 2, 4, 6 and 7, a transition may be reported to all clients in addition to being internally administered.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

allowing at least two software clients to use a connection to the Internet at the same time;

determining when both clients have released the connection; and discontinuing the connection when both clients have released the connection.

2. The method of claim 1 including enabling said clients to connect to the Internet through a software layer and using the layer to accommodate at least two different types of Internet connections.

3. The method of claim 1 including monitoring the connection so that the connection is not released until all clients using the connection have released the connection.

4. The method of claim 1 including monitoring the connection for a connection failure.

5. The method of claim 1 including receiving a request from a client for a connection and determining whether a connection has already been established.

6. The method of claim 1 including providing a state machine having a busy state when the connection is being used by a client and an idle state when the connection is not being used by a client.

7. An article comprising a medium storing instructions that enable a processor-based system to:

allow at least two software clients to use a connection to the Internet at the same time;

determine when both clients have released the connection; and discontinue the connection when both clients have released the connection.

8. The article of claim 7 further storing instructions that enable the processor-based system to enable the clients to connect to the Internet through a software layer and use the layer to accommodate at least two different types of Internet connections.

9. The article of claim 7 further storing instructions that enable the processor-based system to monitor the connection so that the connection is not released until all clients using the connection have released the connection.

10. The article of claim 7 further storing instructions that enable the processor-based system to monitor the connection for a connection failure.

11. The article of claim 7 further storing instructions that enable the processor-based system to receive a request from a client for a connection and to determine whether a connection has already been established.

12. The article of claim 7 further storing instructions that enable the processor-based system to implement a state machine having a busy state when a connection is being used by the client and an idle state when the connection is not being used by the client.

13. A system comprising:

a processor;

an interface to enable a connection to the Internet; and a storage storing instructions that enable at least two software clients to use a connection to the Internet at the same time, determine when both clients have released the connection and discontinue the connection when both clients have released the connection.

14. The system of claim 13 wherein said storage stores instructions that enable the client to connect to the Internet through a software layer and use the layer to accommodate at least two different types of Internet connections.

15. The system of claim 13 wherein said storage stores instructions to enable the system to monitor the connection so that the connection will not be released until all clients using the connection have released the connection.

16. The system of claim 13 wherein said storage stores instructions to monitor the connection for a connection failure.

17. The system of claim 13 wherein said storage stores instructions to enable the system to receive a request from a client for a connection and to determine whether a connection has already been established.

18. The system of claim 13 wherein said storage stores instructions to implement a state machine having a busy state when a connection is being used by a client and an idle state when the connection is not being used by a client.

* * * * *